US011005859B1

(12) United States Patent
Kronrod et al.

(10) Patent No.: US 11,005,859 B1
(45) Date of Patent: May 11, 2021

(54) METHODS AND APPARATUS FOR PROTECTING AGAINST SUSPICIOUS COMPUTER OPERATIONS USING MULTI-CHANNEL PROTOCOL

(71) Applicant: EMC IP Holding Company LLC, Hopkinton, MA (US)

(72) Inventors: Boris Kronrod, Concord, MA (US); Ayelet Biger-Levin, Newton, MA (US); Maor Franco, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 321 days.

(21) Appl. No.: 15/274,075

(22) Filed: Sep. 23, 2016

(51) Int. Cl.
*H04L 29/06* (2006.01)

(52) U.S. Cl.
CPC ......... *H04L 63/1416* (2013.01); *H04L 63/08* (2013.01); *H04L 63/10* (2013.01); *H04L 63/18* (2013.01)

(58) Field of Classification Search
CPC ..... H04L 63/1416; H04L 63/08; H04L 63/10; H04L 63/18
USPC ............................................................ 726/4
See application file for complete search history.

(56) References Cited

U.S. PATENT DOCUMENTS

| 7,600,128 | B2* | 10/2009 | Pritchard | H04L 63/0846 713/183 |
| 8,887,277 | B1* | 11/2014 | Sobel | H04L 67/2852 726/22 |
| 2004/0123142 | A1* | 6/2004 | Dubal | H04L 63/1458 726/22 |
| 2005/0097320 | A1* | 5/2005 | Golan | G06F 21/40 713/166 |
| 2005/0120214 | A1* | 6/2005 | Yeates | H04L 63/08 713/171 |
| 2005/0268107 | A1* | 12/2005 | Harris | G06F 21/31 713/182 |
| 2008/0268815 | A1* | 10/2008 | Jazra | H04L 63/0272 455/411 |
| 2010/0293598 | A1* | 11/2010 | Collart | G06F 17/30056 726/3 |
| 2011/0018754 | A1* | 1/2011 | Tojima | G08C 17/00 341/176 |
| 2011/0197059 | A1* | 8/2011 | Klein | H04L 9/083 713/155 |

(Continued)

*Primary Examiner* — Jahangir Kabir
(74) *Attorney, Agent, or Firm* — Ryan, Mason & Lewis, LLP

(57) ABSTRACT

Techniques are provided for preventing suspicious computer operations using a multi-channel protocol. An exemplary method includes detecting an operation comprising suspicious activity on a first device of a user; in response to the detecting, providing a control signal to suspend the operation on the first device; providing a notification of the suspicious activity to an identity system, wherein the identity system (i) provides an approval request to a distinct second device of the user to verify whether the operation is an authorized operation, (ii) receives a reply from the second device comprising an indication of whether the operation is an authorized operation, and (iii) notifies the first device of whether the operation is an authorized operation; and providing a control signal to enable the operation to proceed on the first device responsive to the reply from the second device indicating that the operation was an authorized operation.

20 Claims, 4 Drawing Sheets

(56) References Cited

U.S. PATENT DOCUMENTS

| | | | | |
|---|---|---|---|---|
| 2012/0117183 | A1* | 5/2012 | Wong | H04L 63/101 |
| | | | | 709/217 |
| 2012/0233696 | A1* | 9/2012 | Zeng | G06F 9/00 |
| | | | | 726/24 |
| 2012/0303768 | A1* | 11/2012 | Fiennes | H04N 21/4126 |
| | | | | 709/220 |
| 2013/0208893 | A1* | 8/2013 | Shablygin | H04L 9/0822 |
| | | | | 380/277 |
| 2014/0189808 | A1* | 7/2014 | Mahaffey | H04L 63/083 |
| | | | | 726/4 |
| 2014/0282846 | A1* | 9/2014 | DeWeese | H04L 63/0428 |
| | | | | 726/1 |
| 2015/0281009 | A1* | 10/2015 | Melcher | G06T 11/206 |
| | | | | 709/224 |
| 2015/0295800 | A1* | 10/2015 | Bala | H04L 67/2819 |
| | | | | 709/224 |
| 2015/0295901 | A1* | 10/2015 | Woodward | H04W 12/06 |
| | | | | 713/168 |
| 2015/0296074 | A1* | 10/2015 | Shah | H04M 1/72577 |
| | | | | 455/418 |
| 2016/0099956 | A1* | 4/2016 | Amit | H04L 63/1416 |
| | | | | 726/23 |
| 2016/0112770 | A1* | 4/2016 | Harrison | G06F 9/5072 |
| | | | | 725/31 |
| 2016/0217283 | A1* | 7/2016 | Liu | G06F 21/566 |
| 2016/0224786 | A1* | 8/2016 | Swidowski | G06F 21/554 |
| 2016/0301794 | A1* | 10/2016 | Schlakman | G06Q 10/06 |
| 2017/0006009 | A1* | 1/2017 | Hessler | G06F 21/10 |
| 2017/0075749 | A1* | 3/2017 | Ambichl | G06F 11/079 |
| 2017/0086069 | A1* | 3/2017 | Liu | H04W 12/06 |
| 2017/0111388 | A1* | 4/2017 | Mehta | H04L 63/1441 |
| 2017/0346815 | A1* | 11/2017 | Andrews | H04L 63/0853 |

* cited by examiner

METHODS AND APPARATUS FOR PROTECTING AGAINST SUSPICIOUS COMPUTER OPERATIONS USING MULTI-CHANNEL PROTOCOL

FIELD

The field relates generally to computer networks, and more particularly, to techniques for providing security in a computer network.

BACKGROUND

A computer network is typically configured to incorporate security functionality in order to protect the computers of the network against malicious activity. Malware (i.e., malicious software) is a common computer security risk that typically aims to disrupt computer operations, gather sensitive information, and/or gain access to a computing device. Such malicious activity can include, for example, ransomware attacks in which malware infecting one or more computers of the computer network will systematically encrypt files on those computers and possibly other computers of the network. The attacker withholds the corresponding decryption key unless a ransom is paid by the victim.

Conventional techniques for combatting ransomware and other malware attacks detect the attacks and notify a security analyst of the event. A need exists for techniques for preventing suspicious computer operations unless they are authorized by a legitimate user.

SUMMARY

Illustrative embodiments of the invention provide techniques for preventing suspicious computer operations using a multi-channel protocol. An exemplary computer-implemented method can include the steps of detecting an operation comprising suspicious activity on a first device of a user; in response to the detecting, performing the following steps, using at least one processing device: providing a control signal to suspend the operation on the first device; providing a notification of the suspicious activity to an identity system, wherein the identity system (i) provides an approval request to a distinct second device of the user to verify whether the operation is an authorized operation, (ii) receives a reply from the second device of the user comprising an indication of whether the operation was an authorized operation, and (iii) notifies the first device of the user of whether the operation is an authorized operation; and providing a control signal to enable the operation to proceed on the first device responsive to the reply from the second device indicating that the operation is an authorized operation.

In one or more embodiments, the detecting is performed by a desktop detection agent and the suspicious activity is detected by identifying one or more predefined activities. The approval request optionally comprises an authentication request of the user.

In at least one embodiment, a notification of the suspicious activity is provided to a security operation center if the reply from the second device indicates that the operation was not authorized by the user.

These and other illustrative embodiments include, without limitation, methods, apparatus, networks, systems and processor-readable storage media.

DETAILED DESCRIPTION

Illustrative embodiments of the present invention will be described herein with reference to exemplary computer networks and associated computers, storage devices, security appliances and other types of processing devices. It is to be appreciated, however, that the invention is not restricted to use with the particular illustrative computer network and processing device configurations shown. Accordingly, the term "computer network" as used herein is intended to be broadly construed, so as to encompass, for example, any system comprising multiple networked processing devices.

In one or more embodiments, suspicious computer operations are detected and suspended by a detection and control agent operating, for example, on the desktop of a legitimate user. In the case of ransomware, for example, massive file deletion can be detected and suspended by the detection and control agent. The detection and control agent, however, cannot be sure that the detected activity is actually an attack and not authorized behavior of the legitimate user.

In at least one embodiment of the invention, in response to detecting one or more predefined suspicious operations, the exemplary detection and control agent suspends the operation on the desktop device of the user; and notifies an identity system of the suspicious activity. The identity system then provides an approval request to a distinct second device of the user (such as a mobile device) to verify whether the operation was an authorized operation, receives a reply from the second device of the user indicating whether the operation was an authorized operation, and notifies the first device of the user of whether the operation was an authorized operation. The exemplary detection and control agent then enables the operation to proceed on the first device only if the reply from the second device indicates that the operation was authorized.

Figure 1:
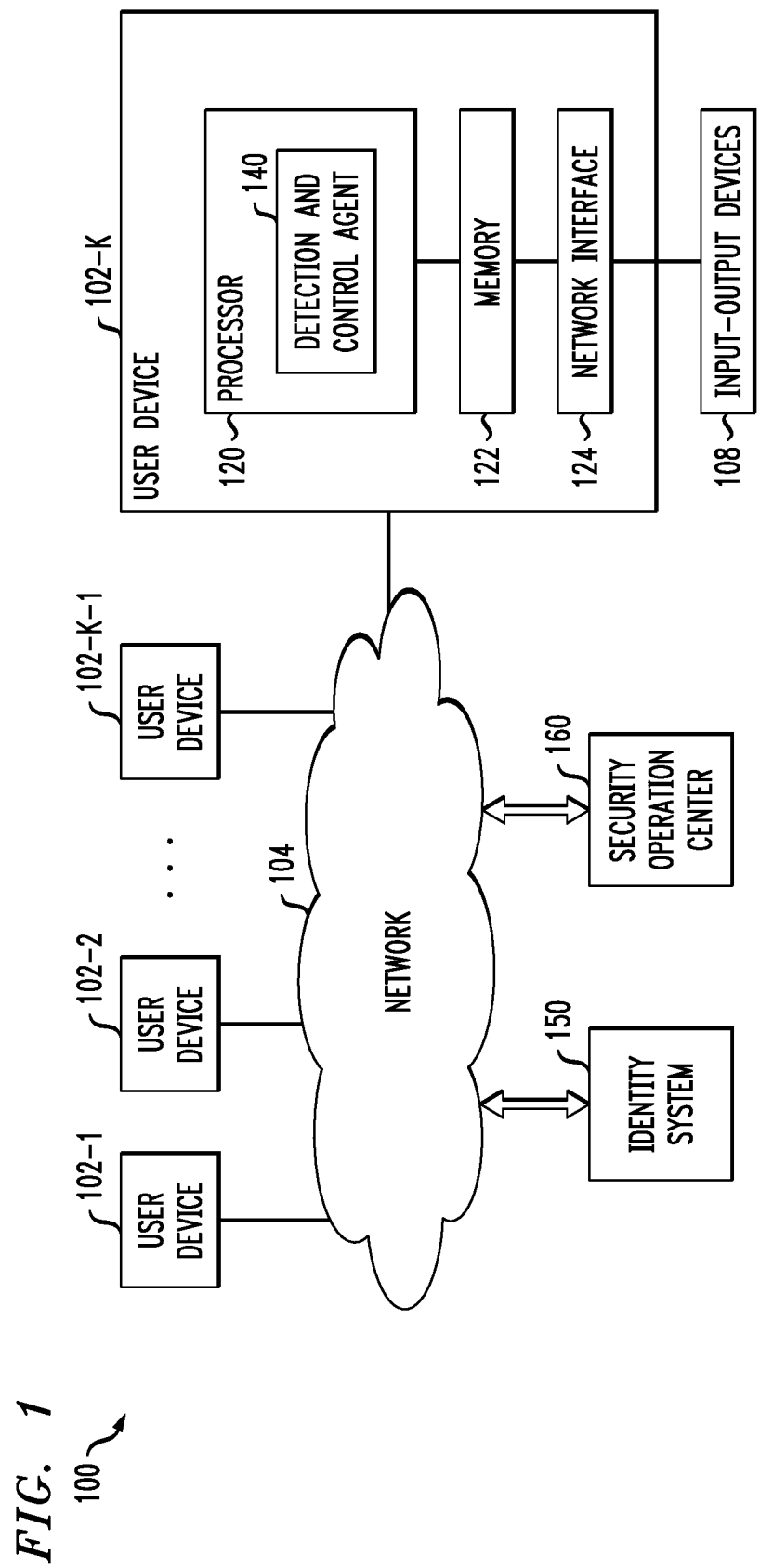
FIG. 1 is a block diagram of a computer network configured for multi-channel prevention of suspicious computer operations in an illustrative embodiment of the invention.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks each comprising processing devices configured to communicate using IP or other related communication protocols.

An identity system 150 and a security operation center 160, each discussed further below, are also connected to the network 104. Generally, the exemplary identity system 150 performs an Identity and Access Management (IAM) function. The exemplary security operation center 160 provides a security operations analyst access to a centralized repository of threat information that can be used to identify and investigate attacks, and the tools to take targeted action on the most critical incidents.

The user device 102-K in the FIG. 1 embodiment is assumed to be implemented using at least one processing device. Each such processing device generally comprises at least one processor and an associated memory, and implements one or more functional modules for controlling certain features of the user device 102-K. More particularly, the user device 102-K in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements. The processor 120 further comprises a detection and control agent 140, as discussed further below in conjunction with FIGS. 2-4.

In one or more embodiments, the exemplary detection and control agent 140 may be implemented, for example, as the RSA® ECAT® and/or NetWitness® endpoint threat detection and response systems, commercially available from Dell Technologies. Generally, the exemplary detection and control agent 140 has a low level access with both a kernel and user level driver on an endpoint, and is able to perform detection leveraging behavior based techniques and generate alerts on suspicious modules which can be immediately dangerous and thus should be prevented (pre-execution).

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the user device 102-K to communicate over the network 104 with the user devices 102, identity system 150 and security operation center 160, and illustratively comprises one or more conventional transceivers.

Also associated with the user device 102-K are input-output devices 108, which illustratively comprise keyboards, displays or other types of input-output devices in any combination. Such input-output devices are used to support one or more user interfaces to the user device 102-K, as well as to support communication between the user device 102-K and other related systems and devices not explicitly shown.

In one or more embodiments of the invention, outputs generated by the user device 102-K can be provided over the network 104 to one or more network security tools. Such devices can illustratively comprise one or more types of processing devices configured for communication over network 104 with the user device 102-K.

It is to be understood that the particular set of elements shown in FIG. 1 for implementing prevention of suspicious computer operations using a multi-channel protocol is presented by way of illustrative example only, and in other embodiments additional or alternative elements may be used. Thus, another embodiment may include additional or alternative systems, devices and other network entities, as well as different arrangements of modules and other components.

Figure 2:
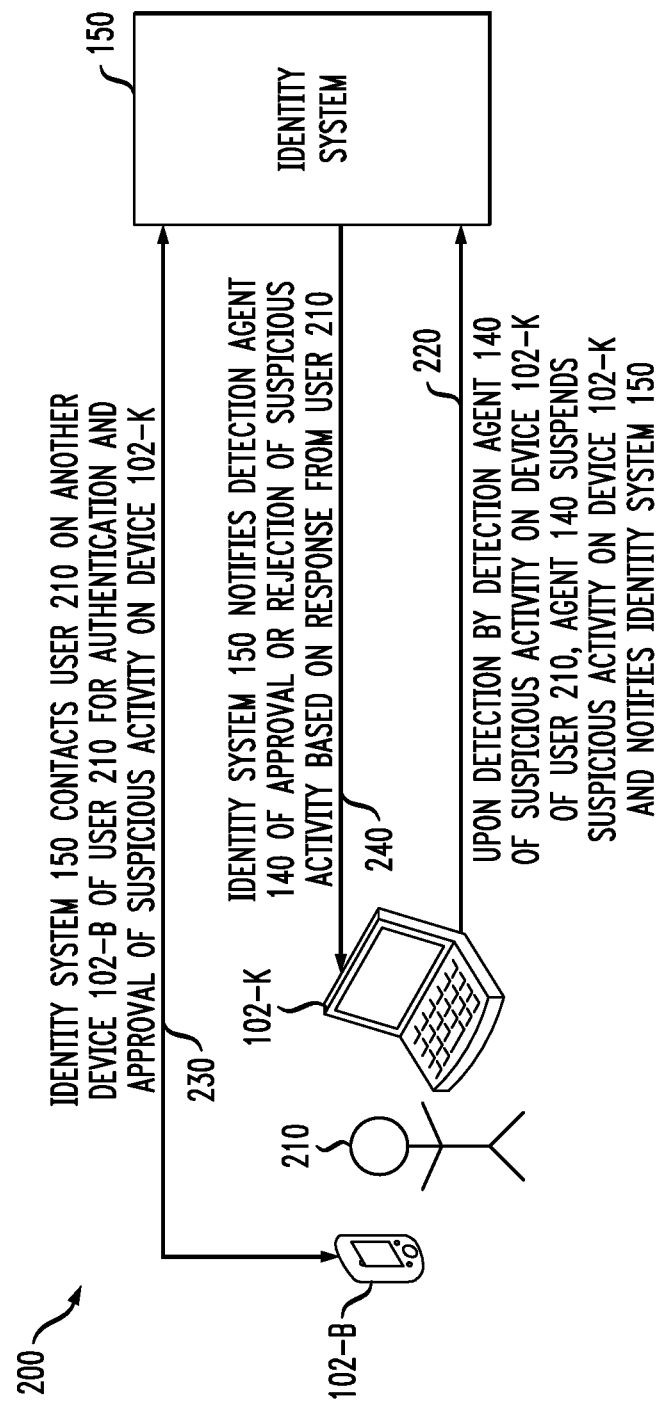
FIG. 2 is a flow diagram illustrating an exemplary implementation of a multi-channel protocol for preventing suspicious computer operations according to one embodiment of the invention.

FIG. 2 is a flow diagram illustrating an exemplary implementation of a multi-channel protocol 200 for preventing suspicious computer operations according to one embodiment of the invention. As shown in FIG. 2, a user 210 is employing the user device 102-K of FIG. 1 as a first device. During step 220, the detection agent 140 detects suspicious activity on device 102-K, suspends the detected suspicious activity on device 102-K and notifies the identity system 150. The detection can be performed, for example, using malware signature-based techniques (e.g., known Indicators of Compromise—IOC; or hash identifiers) or using predefined rules that classify a particular sequence of actions as being suspicious.

During step 230, the identity system 150 contacts the user 210 on another device 102-B of the user 210 for authentication and approval of the suspicious activity occurring on the first device 102-K. During step 240, the identity system 150 notifies the detection agent 140 of the approval or rejection of the suspicious activity based on the out-of-band response from the user 210. The detection agent 140 can then enable the operation or permanently suspend the operation based on the user response.

For example, the notification to the user during step 230 for approval can be implemented, for example, by opening a ticket in a ticketing system. The ticketing system can be implemented, for example, as any commercially available ticketing system or can be implemented, for example, as a ticketing system dedicated to security analysts, such as RSA® Security Operation Center®, commercially available from Dell Technologies. Once a ticket is created, in order to access the ticket, the user must perform multi-factor authentication that leverages an out-of-band channel, such as the mobile device of the user if the suspicious activity is on the desktop computer of the user. Once the user accesses the ticketing system to review the potential attack description, the user can confirm that this is a malicious attack, can provide more information (e.g., I accessed this site and downloaded these files) or can deny that this is risky (e.g., I am running some batch operations on my device).

When a computer is attacked and there is a possibility for legitimate user activity, then the control system should suspend the risky operation and ask for permission from a user, which is logged to this computer via the out-of-band channel.

After the notification, the exemplary control system waits for approval through the same out-of-band channel using one or more strong authentication methods which can ensure that this is a real and genuine user who confirms or denies the activity as being legitimate.

Figure 3:
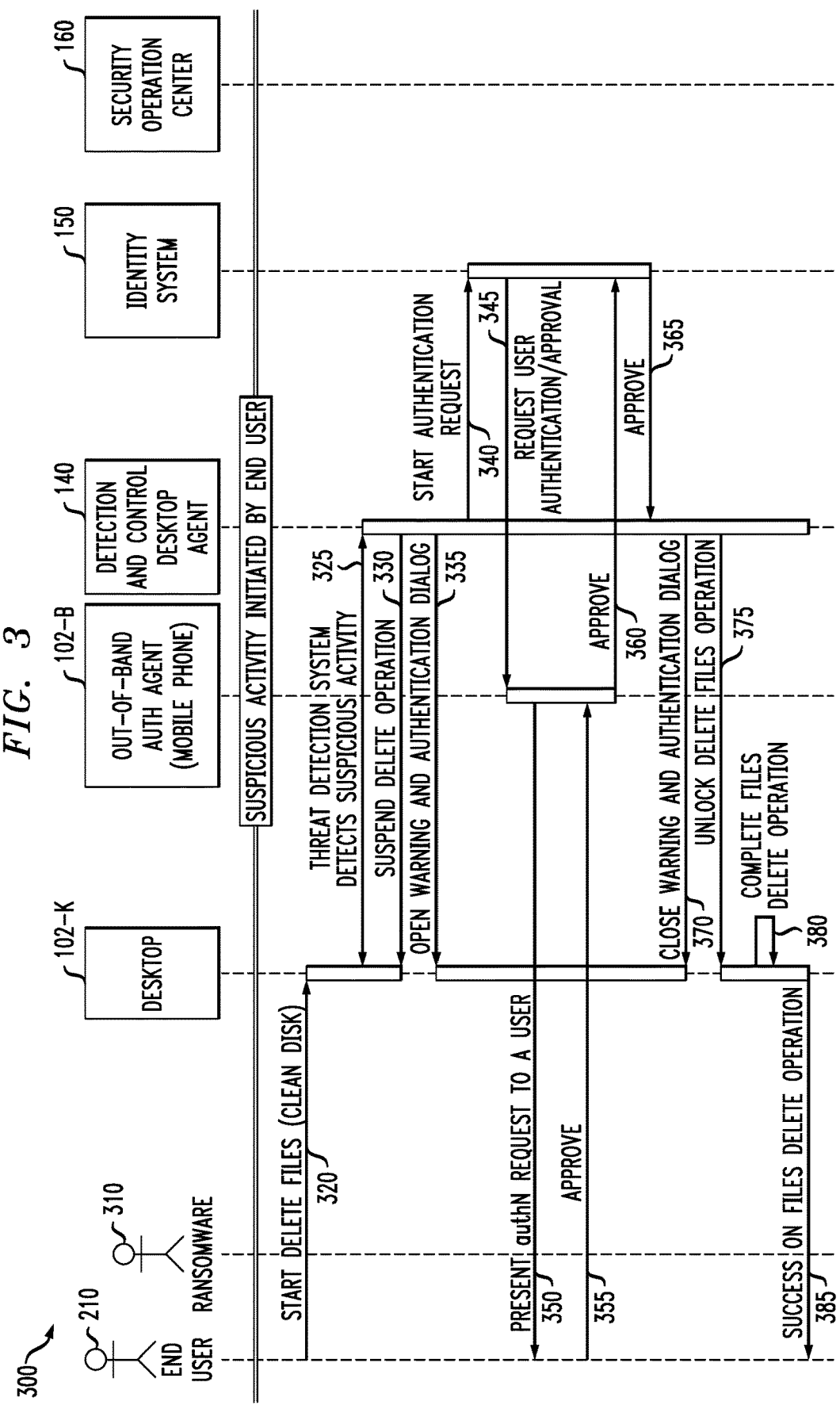
FIGS. 3 and 4 are communication diagrams illustrating an exemplary implementation of the multi-channel protocol of FIG. 2 for preventing suspicious computer operations in the case where the detected suspicious activity is initiated by an authorized user and malware, respectively.

FIG. 3 is a communication diagram 300 illustrating an exemplary implementation of the multi-channel protocol 200 (FIG. 2) for preventing suspicious computer operations in the case where the detected suspicious activity is initiated by an authorized user. As shown in FIG. 3, the end user 210 starts to delete files (e.g., to clean the disk) on the desktop device 102-K of the user during step 320. Thereafter, the detection and control agent 140 on the desktop device 102-K detects the file deletion as suspicious activity during step 325.

The exemplary detection and control agent 140 suspends the delete operation during step 330 and opens a warning and authentication dialog with the user 210 on the desktop device 102-K during step 335. In addition, the detection and control agent 140 starts an authentication request with the identity system 150 during step 340.

The identity system 150 then requests an authentication/approval of the user 210 during step 345 using an out-of-band authentication agent on another device of the user 210, such as device 102-B. The authentication request, such as an authN request, is presented to the user 210 during step 350. The user recognizes that activity as his or her own legitimate activity and approves the activity with an approval message during step 355 using his or her second device 102-B. The approval message is then sent during step 360 to the identity system 150.

The identity system 150 notifies the detection and control agent 140 of the approval message during step 365. The detection and control agent 140 then closes the warning and authentication dialog on the user device 102-K during step 370 and sends a signal to unblock the file operation(s) during step 375. The user device 102-K completes the file deletion operation(s) during step 380 and notifies the user 210 of the success on the files delete operation(s) during step 385.

Figure 4:
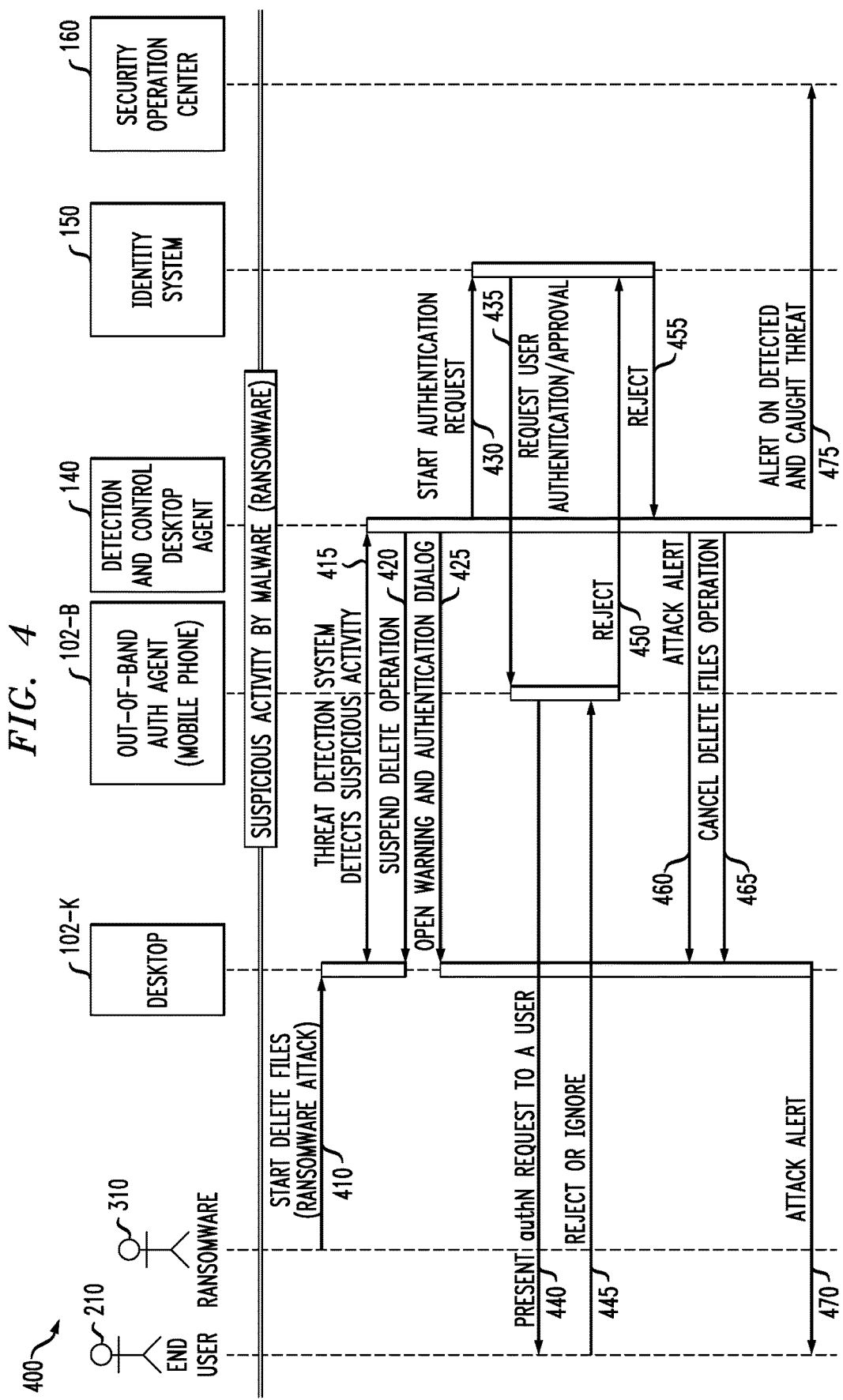

FIG. 4 is a communication diagram 400 illustrating an exemplary implementation of the multi-channel protocol 200 (FIG. 2) for preventing suspicious computer operations in the case where the detected suspicious activity is initiated by malware. As shown in FIG. 4, ransomware 310 starts to delete files (e.g., a ransomware attack) on the desktop device 102-K of the user during step 410. Thereafter, the detection and control agent 140 on the desktop device 102-K detects the file deletion as suspicious activity during step 415.

The exemplary detection and control agent 140 suspends the delete operation during step 420 and opens a warning and authentication dialog with the user 210 on the desktop device 102-K during step 425. In addition, the detection and control agent 140 starts an authentication request with the identity system 150 during step 430.

The identity system 150 then requests an authentication/approval of the user 210 during step 435 using an out-of-band authentication agent on another device of the user 210, such as device 102-B. The authentication request, such as an authN request, is presented to the user 210 during step 440. The user does not recognize the activity as his or her own legitimate activity and rejects or ignores the activity with a reject or ignore message during step 445 using his or her second device 102-B. The reject or ignore message is then sent during step 450 to the identity system 150.

The identity system 150 notifies the detection and control agent 140 of the rejection message during step 455. The detection and control agent 140 then notifies the user device 102-K of the attack alert during step 460 and cancels the delete files operation(s) during step 465. The user device 102-K notifies the user 210 of the attack alert during step 470.

In addition, the exemplary detection and control agent 140 also notifies the security operation center 160 of the detected and caught threat during step 475.

The particular processing operations and other network functionality described in conjunction with the flow and communication diagrams of FIGS. 2-4 are presented by way of illustrative example only, and should not be construed as limiting the scope of the invention in any way. Alternative embodiments can use other types of processing operations to detect suspicious operations and undertake appropriate remediation actions. For example, the ordering of the process steps may be varied in other embodiments, or certain steps may be performed concurrently with one another rather than serially.

The above-described illustrative embodiments provide significant advantages relative to conventional approaches. For example, some embodiments are configured to provide improved detection and prevention of suspicious computer operations.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker™ containers or other types of Linux® containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a Wi-Fi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRack™ or Vblock® converged infrastructure commercially available from VCE™, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method, comprising:
   detecting, by a detection agent executing on at least one processing device on a first device of a user, an operation comprising suspicious activity indicative of a ransomware attack on the first device of a user, wherein the operation comprises one or more of deleting one or more files from said first device and encrypting one or more files on said first device;
   in response to detecting that the operation comprises suspicious activity, performing the following steps, by the detection agent using the at least one processing device:
      providing a control signal to suspend said operation on said first device;
      providing a notification of said suspicious activity to an identity system, wherein said identity system (i) provides an approval request to a distinct second device of said user to verify whether said operation is an authorized operation, (ii) receives a reply from said second device of said user comprising an indication of whether said operation is an authorized operation, and (iii) notifies said first device of said user of whether said operation is an authorized operation, wherein said approval request is processed using a ticket in a ticketing system, wherein said ticket is created in response to detecting said operation, and wherein said reply is received based at least in part on said second device accessing said ticket in said ticketing system to provide information pertaining to said operation; and
      providing a control signal to enable said operation to proceed on said first device responsive to said reply from said second device indicating that said operation is an authorized operation.

2. The method of claim 1, wherein said detecting is performed by a desktop detection agent.

3. The method of claim 1, wherein said suspicious activity is detected by identifying one or more predefined activities.

4. The method of claim 1, wherein said approval request further comprises an authentication request of said user.

5. The method of claim 1, further comprising the step of providing a notification of said suspicious activity to a security operation center if said reply from said second device indicates that said operation is not authorized by said user.

6. The method of claim 1, wherein said approval request is sent to said second device of said user using a communication channel that is out-of-band with respect to the communication channel of said first device.

7. The method of claim 1, wherein said suspicious activity comprises deleting said one or more files.

8. A computer program product, comprising a non-transitory machine-readable storage medium having encoded therein executable code of one or more software programs, wherein the one or more software programs when executed by at least one processing device perform the following steps:
   detecting, by a detection agent executing on at least one processing device on a first device of a user, an operation comprising suspicious activity indicative of a ransomware attack on the first device of a user, wherein the operation comprises one or more of deleting one or more files from said first device and encrypting one or more files on said first device;
   in response to detecting that the operation comprises suspicious activity, performing the following steps, by the detection agent using the at least one processing device:
      providing a control signal to suspend said operation on said first device;
      providing a notification of said suspicious activity to an identity system, wherein said identity system (i) provides an approval request to a distinct second device of said user to verify whether said operation is an authorized operation, (ii) receives a reply from said second device of said user comprising an indication of whether said operation is an authorized operation, and (iii) notifies said first device of said user of whether said operation is an authorized operation, wherein said approval request is processed using a ticket in a ticketing system, wherein said ticket is created in response to detecting said operation, and wherein said reply is received based at least in part on said second device accessing said ticket in said ticketing system to provide information pertaining to said operation; and providing a control signal to enable said operation to proceed on said first device responsive to said reply from said second device indicating that said operation is an authorized operation.

9. The computer program product of claim 8, wherein said detecting is performed by a desktop detection agent.

10. The computer program product of claim 8, wherein said suspicious activity is detected by identifying one or more predefined activities.

11. The computer program product of claim 8, wherein said approval request further comprises an authentication request of said user.

12. The computer program product of claim 8, further comprising the step of providing a notification of said suspicious activity to a security operation center if said reply from said second device indicates that said operation is not authorized by said user.

13. The computer program product of claim 8, wherein said approval request is sent to said second device of said user using a communication channel that is out-of-band with respect to the communication channel of said first device.

14. The computer program product of claim 8, wherein said suspicious activity comprises deleting said one or more files.

15. A system, comprising:
a memory; and
at least one processing device, coupled to the memory, operative to implement the following steps:
detecting, by a detection agent executing on at least one processing device on a first device of a user, an operation comprising suspicious activity indicative of a ransomware attack on the first device of a user, wherein the operation comprises one or more of deleting one or more files from said first device and encrypting one or more files on said first device;

in response to detecting that the operation comprises suspicious activity, performing the following steps, by the detection agent using the at least one processing device:

providing a control signal to suspend said operation on said first device;

providing a notification of said suspicious activity to an identity system, wherein said identity system (i) provides an approval request to a distinct second device of said user to verify whether said operation is an authorized operation, (ii) receives a reply from said second device of said user comprising an indication of whether said operation is an authorized operation, and (iii) notifies said first device of said user of whether said operation is an authorized operation, wherein said approval request is processed using a ticket in a ticketing system, wherein said ticket is created in response to detecting said operation, and wherein said reply is received based at least in part on said second device accessing said ticket in said ticketing system to provide information pertaining to said operation; and providing a control signal to enable said operation to proceed on said first device responsive to said reply from said second device indicating that said operation is an authorized operation.

16. The system of claim 15, wherein said detecting is performed by a desktop detection agent.

17. The system of claim 15, wherein said suspicious activity is detected by identifying one or more predefined activities.

18. The system of claim 15, wherein said approval request further comprises an authentication request of said user.

19. The system of claim 15, further comprising the step of providing a notification of said suspicious activity to a security operation center if said reply from said second device indicates that said operation was not authorized by said user.

20. The system of claim 15, wherein said approval request is sent to said second device of said user using a communication channel that is out-of-band with respect to the communication channel of said first device.

\* \* \* \* \*

UNITED STATES PATENT AND TRADEMARK OFFICE
CERTIFICATE OF CORRECTION

Page 1 of 1

PATENT NO. : 11,005,859 B1
APPLICATION NO. : 15/274075
DATED : May 11, 2021
INVENTOR(S) : Boris Kronrod et al.

It is certified that error appears in the above-identified patent and that said Letters Patent is hereby corrected as shown below:

In the Claims

In Claim 8, at Column 8, Line 53, replace "executing on at least one" with -- executing on the at least one --.

In Claim 15, at Column 9, Line 42, replace "executing on at least one" with -- executing on the at least one --.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*